United States Patent [19]

Yasumura et al.

[11] Patent Number: 4,936,723
[45] Date of Patent: Jun. 26, 1990

[54] METHOD AND APPARATUS FOR CUTTING OFF THE BEADS OF SEAM-WELDED PIPES

[75] Inventors: Ichiro Yasumura, Ibaraki; Moriyuki Kakihara, Chiba; Koji Nishimoto; Kuniharu Fujimoto, both of Ibaraki, all of Japan

[73] Assignee: Sumitomo Metal Industries, Ltd., Osaka, Japan

[21] Appl. No.: 225,190

[22] Filed: Jul. 28, 1988

[30] Foreign Application Priority Data

Feb. 22, 1988 [JP] Japan ............................... 63-039154
Mar. 11, 1988 [JP] Japan ............................... 63-057583

[51] Int. Cl.⁵ .............................................. B23D 1/00
[52] U.S. Cl. ................................... 409/299; 83/170
[58] Field of Search ............... 83/170, 188, 191, 192, 83/176; 409/293, 298, 299, 300, 139, 140

[56] References Cited

U.S. PATENT DOCUMENTS 3,834,275  9/1974  Newland ............................. 409/299
3,911,710  10/1975  Gest ..................................... 409/299
4,248,559  2/1981  Deckenback et al. ............. 409/140
4,710,078  12/1987  Altmeyer et al. .................. 409/299

FOREIGN PATENT DOCUMENTS 48-56547  8/1973  Japan .
58-143908  8/1983  Japan .
59-144586  8/1984  Japan .
60-161011  8/1985  Japan ................................. 409/299

Primary Examiner—Douglas D. Watts
Assistant Examiner—Tom Hamill, Jr.
Attorney, Agent, or Firm—Burns, Doane, Swecker & Mathis

[57] ABSTRACT

A method and an apparatus for cutting off the beads of seam-welded pipes are disclosed, in which the skew angle of a freely rotatable circular cutting tool is 25°–35°, and the tilt angle is 15°–25°. The apparatus comprises a double-walled holder, a double-walled impeder, and a head portion on which the cutting tool is mounted.

15 Claims, 4 Drawing Sheets

Fig. 5
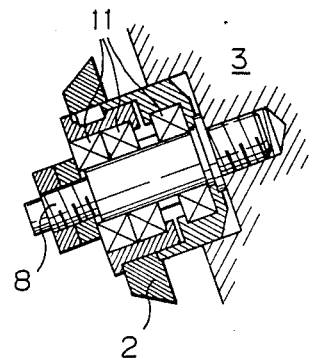
Fig. 6
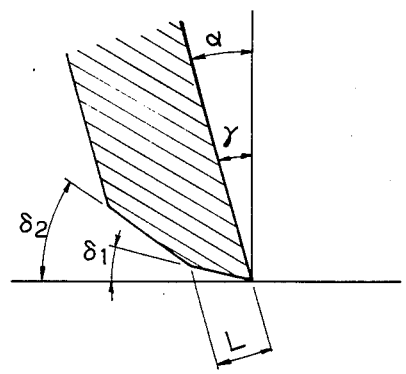
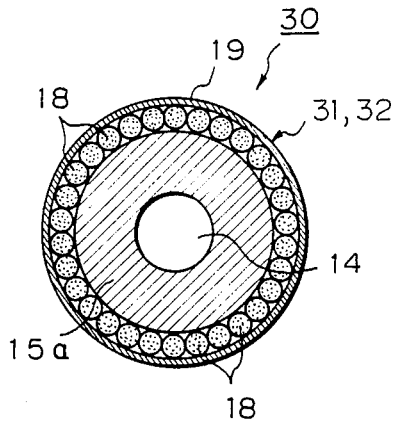
Fig. 10

METHOD AND APPARATUS FOR CUTTING OFF THE BEADS OF SEAM-WELDED PIPES

BACKGROUND OF THE INVENTION

This invention relates to a method and an apparatus for cutting off the beads of seam-welded pipes and especially of hot-shaped, seam-welded pipes More particularly, it relates to a method and apparatus for cutting off the beads of seam-welded pipes using a freely-rotatable circular cutting tool.

In the manufacture of seam-welded pipes and particularly hot-shaped seam-welded pipes, an endless strip, referred to as a skelp, is continuously passed through a heating furnace and heated to a temperature of at least 850° C., after which it is passed through a series of forming rolls which bend the outer edges of the skelp and form it into the shape of a tube. The resulting tubular object is referred to as an open pipe. The confronting outer edges of the open pipe are as yet unwelded. The open pipe is then passed through a tubular work coil which is somewhat larger than the outer diameter of the open pipe, and the confronting edges of the open pipe are selectively heated to a welding temperature, and the confronting edges of the open pipe are then pressure welded by squeeze rolls which are located downstream of the work coil, thereby forming a seam-welded pipe. Due to the heating and pressure welding, the inner and outer surfaces of the welded seam swells to form beads on the inside and outside of the pipe. The pipe is then sent to a finishing apparatus which cuts off the beads. It is important to cut off the beads smoothly so that there is no difference in thickness between the portion of the pipe which is cut and the adjoining portions. However, as the removal of the inner bead must be performed inside the pipe, it is generally difficult to cut the beads off smoothly. Normally, a slender mandrel is inserted from an open space upstream of where the forming rolls form the skelp into a tube to the downstream side of the squeeze rolls, and a circular cutting tool is mounted on the tip of the mandrel. Accordingly, the mandrel passes through the entire length of the open pipe and the cutting tool is secured to the mandrel downstream of the squeeze rolls.

In order to selectively heat the edge portions of the open pipe which are to be welded, a high-frequency current is passed therethrough by the work coil. Due to the skin effect, currents are induced on the circumferential surface of the open pipe, and heating is accomplished by the concentration of the current in the portions to be welded. However, if the induced current leaks to outside the portions to be welded, the welding efficiency decreases. Therefore, the leak current should be as small as possible, and in actual practice, an impeder having a ferrite core is disposed inside the open pipe so as to confront the work coil. Generally, since a mandrel for cutting off the beads on the inside of a seam-welded pipe passes through the center of the open pipe, the impeder is mounted on the mandrel opposite the work coil.

Seam welding can be formed in a hot or cold state. When cutting off the beads on the inside of a cold-shaped, seam-welded pipe, in order to prevent excess or inadequate cutting, a full-type cutting tool having the same curvature as the inside of the pipe is used. Even when the seam-welded pipe is itself in a cold state, as cutting is performed immediately after welding when the bead is still hot, the cutting tool normally has to be replaced after 1.5–2.5 hours of use. The production line must be stopped for a long time when the cutting tool is replaced. The time lost for replacement of the cutting tool has an adverse effect on productivity, since the forming and welding processes for seam-welded pipes and the bead cutting operation are all performed continuously, so that when the cutting tool is replaced, all three of these operations must be halted.

When manufacturing hot-shaped seam-welded pipes, if the same cutting method is used as for cold-shaped seam-welded pipes, decreases in productivity due to cutting tool replacement are even greater. When replacing the cutting tool, it is necessary to stop the production line just as when manufacturing cold-shaped seam-welded pipes. While the production line is stopped, it is also necessary to lower the temperature of the furnace in which the skelp is heated to the rolling temperature so that the skelp will not melt through and sever. After the cutting tool is replaced and the line is restarted, the furnace temperature is again raised, but skelp must be passed through the furnace for some length of time before the skelp temperature stabilizes, and the length of skelp which passes through the furnace until the skelp temperature stabilizes must be discarded. Furthermore, as the cutting tool operates in a high-temperature environment, the life span of the cutting tool and the length of time between replacements of the cutting tool are much shorter than in the manufacture of cold-shaped seam-welded pipes. Accordingly, if the cutting tool must be frequently replaced, not only are there large time losses, but the energy consumption rate rises and there is a large amount of material loss in the form of scrap.

Moreover, when the inside beads of hot-shaped seam-welded pipes are cut off on a production line, just as with cold-shaped seam-welded pipes, a mandrel is inserted into a pipe from a position upstream of where the skelp is formed into an open pipe and the inside bead is cut off by a cutting tool mounted on the end of the mandrel. In hot shaping, the temperature of the skelp is at least 850° C., so even without the heat generated by welding, the mandrel would be heated to around 700° C. by the heat from the open pipe. Therefore, it is generally necessary to provide some form of heat protection for a mandrel used to cut off the inside beads of hot-shaped seam-welded pipes.

For these reasons, in a production line for seam-welded pipes and particularly hot-shaped seam-welded pipes, there is a great need to increase the life span of the cutting tool used for cutting off inside beads and to cool the mandrel on which the cutting tool is mounted.

There have been various proposals for using a circular cutting tool for removing the inside beads of seam-welded pipes. Japanese Published Unexamined patent application No. 48-56547 (1973) discloses the use of a circular cutting tool for removing the inner beads of cold-shaped seam-welded pipes. The cutting tool has a skew angle of 22.5°, although the diameter and the tilt angle of the cutting tool are not specified. No mention is made of the life span of the cutting tool.

Japanese Published Unexamined patent applications Nos. 58-143908 (1983) and 59-144586 (1984) also disclose the use of circular cutting tools for removing inside beads of hot-shaped seam-welded pipes. By using a cutting tool with a diameter of 0.6–0.8 times the diameter of the pipe, a skew angle of 10°–45°, and a tilt angle of 5°–15°, a long life span of 2.5 hours (application No.

58-143908) or 5 hours (application No. 59-144586) can be achieved. For cutting in a high-temperature environment, these life spans are extremely long.

In above-mentioned Japanese Published Unexamined patent applications Nos. 58-143908 and 59-144586, in order to protect the mandrel from heat, the mandrel is formed with a hollow center, and cooling water is passed through the entire length of the mandrel from the base end and then continuing through the holder, the impeder, and the outer end, i.e., head portion on which the cutting tool is mounted. The cooling water is discharged into the seam-welded pipe through gaps between the outer end, i.e., head portion of the mandrel and a plurality of rollers which guide the mandrel along the inside beads of a pipe.

As for the cutting tool itself, in above-mentioned Japanese Published Unexamined patent application No. 48-56547, if the tilt angle is 5°-15°, at a relatively slow line speed of at most 40 m/min, for example, satisfactory cutting can be carried out. However, when the line speed exceeds 100 m/min, the rotation of the cutting tool becomes unstable, and the cutting tool tends to remove too much or too little of the inside surface of a pipe being processed.

In Japanese Published Unexamined patent applications Nos. 58-143908 and 59-144586, the same tendency can be seen when the skew angle is small, but when the skew angle is large, the shape of the cutting tool as seen from the direction of advance of the pipe becomes elliptical, the difference between the curvature of the inside of the pipe and the cutting tool increases, and the cut surface takes on a U-shaped cross section, so that it becomes difficult to perform smooth cutting.

As the life span of cutting tools increases, the length of time which the mandrel must be inserted into an open pipe necessarily increases, and problems occur which were not experienced when cutting tools had a shorter life span.

The holder of the mandrel must support the mandrel so that the opposite end of the mandrel is located downstream of the squeeze rolls, and it must support an impeder so that the impeder confronts a work coil. Therefore, the holder is generally long, and the length of time for which cooling water passes therethrough is also long. As it passes through the holder, the cooling water undergoes a great increase in temperature, and even if the cooling water does not boil, gases which are dissolved in the cooling water come out of solution and remain inside the holder. The longer the mandrel is inserted into an open pipe, the larger the amount of gas which will accumulate inside the holder, and as the gas does not conduct heat as well as the cooling water, a difference in the rate of cooling will develop between the top side of the holder, where the gas accumulates, and the bottom side of the holder, which is in contact only with cooling water. This difference in cooling rates causes the holder to bend. Even if the amount of curvature is minute, as the holder itself is long, the misalignment between both of its ends and the center of the holder is large. Not only does this curvature affect the depth of cutting of the cutting tool, in the worst case, it becomes impossible to detach the rest of the mandrel from the pipe.

The impeder of the mandrel contains a ferrite core which is self-heated by magnetic induction caused by the action of the work coil. Accordingly, the greater the ability to cool the impeder the better. However, the gas which is generated in the holder is carried downstream to the impeder, and due to the gas, the impeder may be inadequately cooled. If the thermal load on the impeder is too large, not only will the ferrite core lose its magnetism, but the FRP cover which surrounds the ferrite core can be damaged, possibly resulting in the breakage of the impeder.

SUMMARY OF THE INVENTION

Accordingly, it is an object of the present invention to provide a method for cutting off the beads of seam-welded pipes, and particularly hot-shaped seam-welded pipes, which does not affect the production line speed, which can provide a smooth cut surface, and which can increase the life span of the cutting tool used to cut off the beads.

It is another object of the present invention to provide a bead cutting apparatus which is equipped with a mandrel for cutting off the beads on the inside of hot-shaped seam-welded pipes which can be efficiently cooled.

A bead cutting method for seam-welded pipes in accordance with the present invention is characterized in that a rotatably-supported circular cutting tool having a diameter of 0.6–0.75 times the inner diameter of a seam-welded pipe to be processed is skewed by 25°–35° with respect to the direction of advance of the pipe and is tilted with respect to the skewed surface by 15–25° in the direction of advance of the pipe.

An apparatus for cutting off the beads on the inside of hot-shaped seam-welded pipes in accordance with the present invention comprises a holder, an impeder, and a head portion which are coaxially disposed and rigidly connected together. A cutting tool is rotatably mounted on the end of the mandrel.

The mandrel has a hollow center which serves as a cooling water passageway. Both the holder and the impeder have a two-walled structure comprising an inner pipe and an outer pipe. The inner pipe serves as a cooling water passageway, while the space between the inner pipe and the outer pipe serves as a water discharge passageway. The end of the cooling water passageway at the end of the impeder near the head portion communicates with the water discharge passageway so that a portion of the water which flows through the cooling water passageway is diverted into the discharge water passageway instead of flowing through the hollow center of the mandrel. After the discharge water flows through the discharge water passageways in the impeder and the holder, it exits from the holder via discharge holes formed in the outer pipe of the holder. The discharge holes are located so that the discharge water passing therethrough will flow into an open pipe upstream of any welded portions so that the discharge water will not affect the welds.

The cutting tool is preferably a circular cutting tool which is rotatably mounted on the mandrel with a skew angle of 25°-35° and a tilt angle of 15°-25°.

In accordance with the present invention, as the skew angle is large, the cutting tool can rotate stably even at a high line speed. On the other hand, because the skew angle is large, the difference between the curvature of the cutting tool and the inside of the pipe being processed is increased, so in order to prevent the cut surface from becoming U-shaped, the tilt angle is given a large value. With a large tilt angle, the angle between the blade tip of the cutting tool and the surface being cut is reduced, and the reduction leads to a decrease in the resistance to breaking of the cutting tool and a decrease in the heat capacity and the thermal conductivity of the blade tip, which is disadvantageous during high-temperature cutting. However, as opposed to these disadvantages, there are the more important advantages that the resistance to cutting is decreased and the thermal load on the cutting tool from the high-temperature bead is decreased, so that the life span of the cutting tool ends up being lengthened.

Furthermore, according to the present invention, a water discharge passage is formed on the outside of a cooling water passage, and a portion of the cooling water which passed through the impeder can be discharged to the outside of the open pipe through the discharge passageway, so the ability to cool the holder and the impeder can be increased without increasing the amount of water which is discharged into the seam-welded pipe. In addition, the provision of the water discharge improves the electric power efficiency.

BRIEF DESCRIPTION OF THE DRAWINGS

FIG. 5 is a cross-sectional view of a circular cutting tool mounted on the end of a mandrel.

FIG. 6 is a cross-sectional view showing the shape of the blade tip of the cutting tool of FIG. 5.

FIG. 10 is a cross-sectional view taken along Line X—X of FIG. 1.

In the figures, the same reference numerals indicate the same or corresponding parts.

DESCRIPTION OF THE PREFERRED EMBODIMENTS

Figure 1:
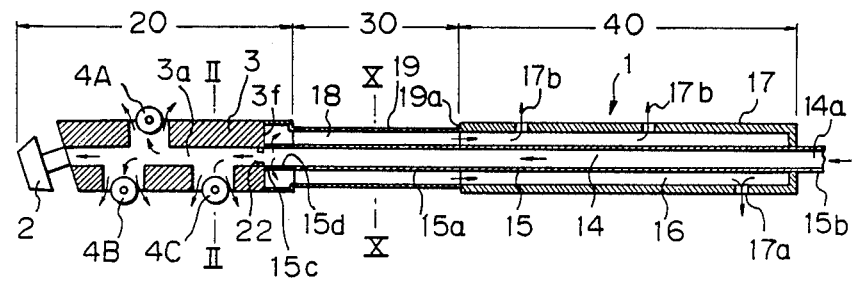
FIG. 1 is a schematic longitudinal cross-sectional view of a cutting apparatus in accordance with the present invention.

Preferred embodiments of a method and apparatus for cutting off the beads of seam-welded pipes in accordance with the present invention will now be described while referring to the accompanying drawings, FIG. 1 of which is a longitudinal cross-sectional view of a cutting apparatus 1 of the present invention. As shown in FIG. 1, the cutting apparatus 1 is a generally cylindrical member which comprises, from its left end to its right end, a head portion 20, an impeder 30, and a holder 40.

Figure 2:
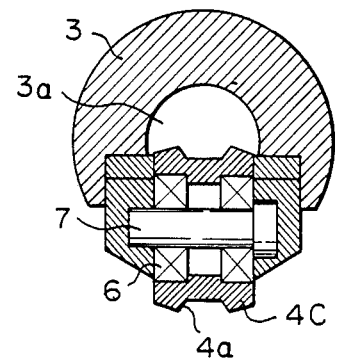
FIG. 2 is a transverse cross-sectional view taken along Line II—II of FIG. 1.

The head portion 20 not only supports a cutting tool 2 but also accurately guides the cutting tool 2 along an unillustrated bead on the inside of a pipe and maintains the infeed of the cutting tool 2 constant. Various means for accomplishing these aims have been developed, but in the present embodiment, the body 3 of the head portion 20 is equipped with rollers 4A–4C which contact the inner surface of an unillustrated pipe on the top, bottom, left, and right sides of the head portion 20. The reaction forces acting on the rollers 4A–4C maintain the mandrel body 3 in a constant position. As shown in FIG. 2, each of the rollers 4A–4C is mounted on a main shaft 7 through bearings 6. In order to insure the smooth rotation of the rollers and to cool them, the rollers are disposed so as to confront a central cavity 3a formed inside the body 3 of the head portion 20. In order to guide the cutting tool 2 along the bead on the inside of the pipe, the rollers 4B and 4C which are disposed on the lower side of the mandrel body 3 each have a groove 4a (only one of which is shown) which is formed in the surface of the roller which contacts and rolls along the inner surface of the pipe. The width of each groove 4a is somewhat larger than the width of the inner bead of the pipe. The grooves 4a straddle the inner bead when the head portion 20 is inserted into the pipe. Accordingly, even if the inner bead does not follow a straight line, the rollers 4B and 4C can follow the bead and adjust the orientation of the mandrel body 3 so that the cutting tool 2 can be accurately guided along the inner bead.

It is easier to obtain a smoothly cut surface if the cutting tool 2 is a full-type cutting tool having the same curvature as the inside of the pipe. However, this type of cutting tool generally has a short life span, and so even though it can be used in manufacturing cold-shaped seam-welded pipes in which losses due to line stoppage are comparatively small, it is not practical for use in the manufacture of hot-shaped seam-welded pipes. As explained earlier, in the manufacture of hot-shaped seam-welded pipes, when a cutting tool is replaced, not only is time lost, after tool replacement, skelp must be passed through the heating furnace until the skelp temperature stabilizes, so a large quantity of skelp is lost as scrap. The amount of scrap increases with the frequency of cutting tool replacement, so a cutting tool with a short life span is a marked disadvantage.

Therefore, in the manufacture of hot-shaped seam-welded pipes, a circular cutting tool is preferable, and this type of cutting tool is employed in the present invention.

Figure 3:
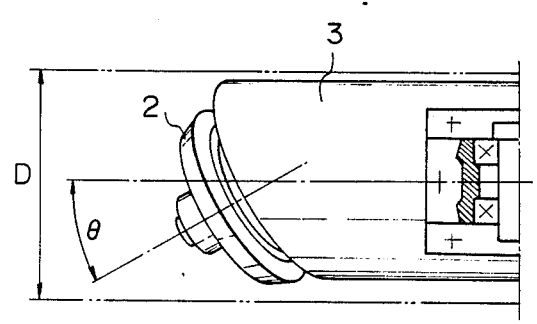
FIG. 3 is a plan view of a circular cutting tool which is mounted on the tip of the mandrel of FIG. 1.
Figure 4:
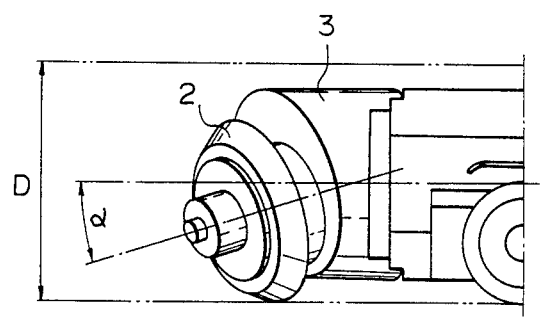
FIG. 4 is a side view of the cutting tool and mandrel of FIG. 3.

FIGS. 3 through 5 illustrate the manner in which a circular cutting tool for use in the present invention is mounted on a mandrel. Normally, a circular cutting tool 2 having a smaller diameter than the inner diameter of the seam-welded pipe to be processed is rotatably supported on a cutting tool shaft 8 by bearings 11. The circular cutting tool 2 is skewed by an angle $\theta$ with respect to the direction of advance of the pipe, whereby the movement of the pipe relative to the cutting tool 2 causes the cutting tool 2 to rotate. At the same time, it is tilted by a prescribed tilt angle $\alpha$ with respect to the skew surface so as to be have a face angle.

In the cutting method of the present invention, if the pipe inner diameter is D, then the diameter of the cutting tool 2 is selected to be 0.6 D–0.75 D. Furthermore, the cutting tool 2 is given a skew angle $\theta$ of 25–35° and a tilt angle $\alpha$ of 15–25°, whereby stable rotation can be achieved at high line speeds, a smoother cut surface can be obtained, and the life span of the cutting tool can be increased.

The larger is the ratio of the diameter of the cutting tool 2 to the diameter of the pipe, the smaller is the difference between the curvatures of the inner surface of the pipe and the cutting tool 2, so a smooth cut surface can be easily obtained. Therefore, the minimum diameter of the cutting tool 2 is 0.6 D. However, as the cutting tool diameter increases, it becomes difficult for chips from the bead to move past the cutting tool, and the chips become entwined around the shaft of the cutting tool. Therefore, in order to make it easy to discharge the chips, the maximum diameter of the cutting tool is 0.75 D.

A skew angle $\theta$ is imparted to the cutting tool in order to make the cutting tool 2 rotate when the pipe is moved with respect thereto. If the skew angle $\theta$ is too small, the rotation of the cutting tool may become unstable at high line speeds. For example, in Japanese Published Unexamined patent application No. 48-56547, a relatively large skew angle of 22.5° is used, and the cutting tool is able to rotate at a relatively low cutting speed corresponding to a line speed of at most 40 m/min (the cutting speed is determined by the line speed). However, at a high line speed of 100 m/min and above, as the resistance to cutting and particularly the thrust acting on the bearings of the cutting tool increase, the rotation of the cutting tool becomes unstable. With a small-diameter cutting tool having a small diameter of rotation, it is especially important to use a large skew angle $\theta$. For example, when the diameter of the cutting tool is less than 75 mm, the skew angle $\theta$ is preferably 30°-35°, and when the diameter is 75 mm or above, the skew angle is preferably 25°-35°. On the other hand, if the skew angle exceeds the preferred range, the shape of the cutting tool as viewed in the direction of advance of the pipe becomes so elliptical that it is not possible to adequately compensate for the skew angle by imparting a tilt angle $\alpha$, and the cut surface becomes U-shaped. In addition, if the skew angle exceeds 35°, even with a small component of force having a direction perpendicular to the direction of advance of the pipe, there is a high probability of the cutting tool separating from the bead, which is undesirable.

The tilt angle $\alpha$ is imparted to the cutting tool in order to decrease the difference, caused by the skew angle, between the curvature of the inner surface of the pipe and the curvature of the shape of the cutting tool as viewed in the direction of advance of the pipe. The tilt angle $\alpha$ is also important in determining the face angle of the cutting tool, so there are restrictions on the tilt angle. Generally, as shown in FIG. 6, the face angle $\gamma$ is the same in magnitude as the tilt angle $\alpha$, and it is said that the life span of the cutting tool is shortened if the face angle is either too large or too small. In addition, the cutting tool is subject to a large thermal load during cutting of an inner bead, so in the past the face angle tended to be small. In Japanese Published Unexamined patent applications Nos. 58-143908 and 59-144586, the optimal face angle for a carbide cutting tool is considered to be 5°-15°. However, as a result of experiments, the present inventors found that the life span of a cutting tool can be increased by using a larger face angle of 15°-25°. The reason for this phenomenon is not clear, but it is thought that if the face angle $\gamma$ is small, the length of time for which high-temperature chips remain in contact with the cutting face is increased, and therefore the dissipation of heat is poor. It is thought that in the present invention, a long life span of the cutting tool is achieved because the face angle $\gamma$ is relatively large, so the cutting resistance is decreased, chips are rapidly removed from the cutting face, and the thermal load on the cutting face from the high-temperature bead is decreased. In the past, as a small tilt angle was used, there was a high probability of the cut surface becoming U-shaped, but in the present invention, as a large tilt angle $\alpha$ is employed, the difference in curvature between the inner surface of the seam-welded pipe and the cutting tool is decreased, and a smoothly cut surface can be easily obtained. The tilt angle $\alpha$ is preferably as large as possible within the range of 15°-25°. The smaller the diameter of the cutting tool, the larger is the desirable value of the tilt angle. However, if the tilt angle exceeds 25°, the angle between the blade tip of the cutting tool and the surface being cut becomes too acute and the resistance to breaking of the blade is greatly decreased. Furthermore, with a large tilt angle, the blade tip is subjected to bending forces and it becomes easily chipped, with the result that the life span of the cutting tool is decreased with a tilt angle of greater than 25°.

As shown in FIG. 6, the flank of the cutting tool has two surfaces which are sloped with respect to one another. Regardless of the tilt angle $\alpha$, the angle $\delta_1$ of the first surface with respect to the surface being cut is preferably 5°-10° and the length L of this surface is preferably 3-5 mm. If the angle $\delta_1$ is too large, the angle of the tip of the cutting tool becomes too sharp, so the life span of the cutting tool is decreased, and at the same time, the infeed of the cutting tool becomes too large. If the length L of this surface is too large, it becomes difficult to feed the pipe. The angle $\delta_2$ of the second surface must be at least 15° to prevent the shoulder of the cutting tool from contacting the pipe surface when the cutting tool is tilted. The nose portion of the blade tip is previously honed, and it is preferably rounded to a curvature of 0.1-0.3 R.

Figure 7:
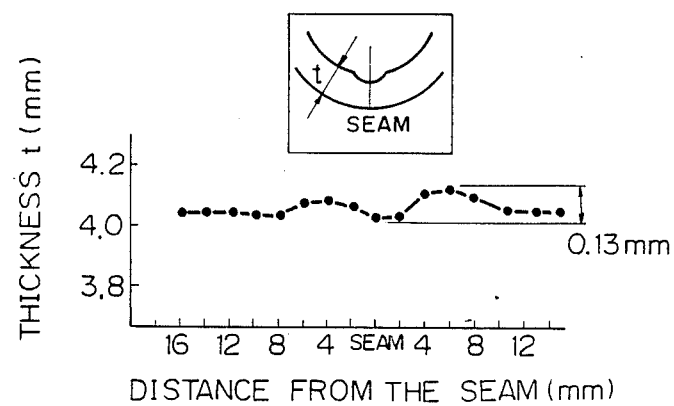
FIG. 7 and FIG. 8 are graphs of the thickness of the portion of a pipe cut in accordance with the method of the present invention and in accordance with a conventional method, respectively.
Figure 8:
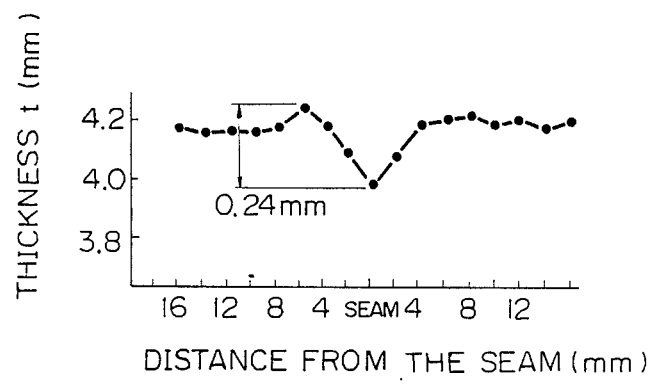

In order to ascertain the effectiveness of the method of the present invention, cutting of the bead of a hot-shaped seam-welded pipe was performed using the cutting apparatus shown in FIG. 1, and the results were compared with those obtained using the method of Japanese Published Unexamined patent application No. 59-144586. However, the cutting apparatus was cooled by the conventional method. The mounting conditions of the cutting tool are shown in Table 1, and the test results are shown in FIG. 7 and FIG. 8.

TABLE 1

|  | Skew angle | Tilt angle | Tool diameter | Flank angle ($\delta_1$) |
| --- | --- | --- | --- | --- |
| Present Invention | 30° | 20° | 80 mm | 10° |
| JP 59-144586 | 30° | 7° | 80 mm | 3° |

The two methods were evaluated by measuring the thickness of the pipe in the cut portions for each method. FIG. 7 shows the results of the method of the present invention, and FIG. 8 shows the results of the method of Japanese Published Unexamined patent application No. 59-144586. As shown in FIG. 7, in accordance with the method of the present invention, there are no local decreases in the thickness of the cut portion, and the effects of increasing the tilt angle can be seen. In general, the guaranteed thickness of a product is the minimum thickness. As the method of the present invention results in very small variations in thickness, it is possible to decrease the overall thickness of a product, resulting in a great increase in yield.

The average life span of a cutting tool when used in accordance with the method of the present invention reached 8 hours, which is 1.6-3 times the life span of a cutting tool when used in accordance with conventional methods.

The cutting method of the present invention can be used for cutting off the beads not only of hot-shaped seam-welded pipes but also of cold-shaped seam-welded pipes.

Next, the structure of a cutting apparatus in accordance with the present invention will be described in further detail.

Figure 9:
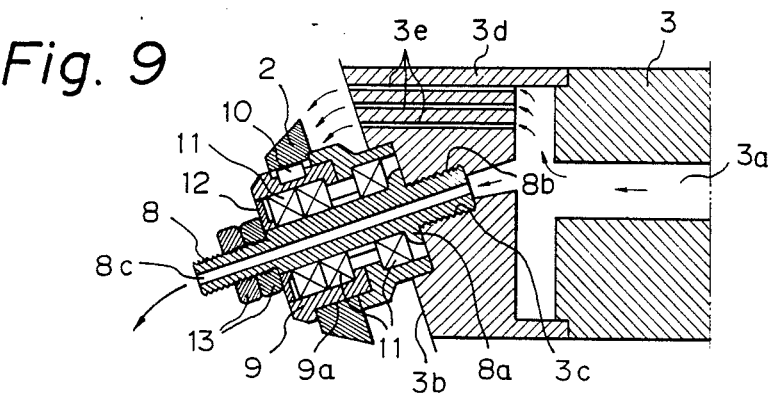
FIG. 9 is an enlarged cross-sectional view of the left end of the cutting apparatus of FIG. 1.

As shown in FIG. 9, a cutting tool shaft 8 is secured to the front surface 3b of a mandrel body 3. A bearing box 9 is rotatably mounted on the cutting tool shaft 8. The bearing box 9 has an outer race consisting of two members which fit together so as to define a circumferential groove 9a in which the cutting tool 2 is secured by a key 10. A plurality of bearing 11 are disposed between the outer race of the bearing box 9 and an inner race which fits over the cutting tool shaft 8. The outer race of the bearing box 9 and the cutting tool 2 can rotate together about the shaft 8. The inner race of the bearing box 9 is prevented from axial movement in one direction by a collar 12 and two nuts 13 which are disposed at one end of the bearing box 9 and is prevented from movement in the opposite direction by a step 8a which is formed in the shaft 8 at the other end of the bearing box 9. The right end of the shaft 8 has male threads 8b formed thereon which screw into female threads 3c formed in the front surface 3b of the mandrel body 3. The front surface 3b of the mandrel body 3 to which the shaft 8 is secured is formed with a prescribed slope so as to give the circular cutting tool 2 the appropriate skew angle and tilt angle.

The skew angle and the tilt angle vary depending on the line speed, but in accordance with the present invention, the skew angle is preferably 25°–35° and the tilt angle is preferably 15°–20°.

During cutting, the bead is at a fairly high temperature of approximately 1400° C. Furthermore, the open pipe generates radiant heat which produces a temperature of 700° C. Therefore, the circular cutting tool 2 and the bearings 11 are subjected to a large thermal load. In order to give the cutting tool 2 and the bearings 11 durability so as to obtain a long life span, it is necessary to cool them adequately. In the past, as the cutting tool and the bearings were cooled indirectly through a block on which the cutting tool was mounted, the cooling was insufficient, and they did not have adequate durability. In the apparatus of the present invention, the bearings 11 are directly cooled by cooling water which passes through a through hole 8c formed in the center of the cutting tool shaft 8. This through hole 8c communicates with a central cavity 3a in the mandrel body 3 which is used as a portion of a cooling water passageway. Furthermore, a plurality of axially-extending through holes 3e are formed in the upper portion of a block 3d which includes the front surface 3b of the mandrel body 3. These through holes 3e extend between the front surface 3b and the central cavity 3a of the mandrel body 3. The outer ends (the left ends in FIG. 9) of the through holes 3e confront the upper portion of the blade tip of the cutting tool 2. Cooling water which is discharged from the through holes 3e first contacts the blade tip of the cutting tool 2 and wets the blade tip, and then it flows downwards and wets the bearing box 9. The cooling water absorbs heat from the cutting tool 2 and the bearing box 9 when it contacts them. In addition, as a large quantity of heat is absorbed when the cooling water evaporates, a large cooling effect can be achieved even with a small amount of cooling water. The bearings 11 are also cooled by the conduction of heat by the bearing box 9 from the bearings 11 to the cooling water on the outside of the bearing box 9, so the bearings 11 are cooled from both inside and outside the bearing box 9.

Next, the impeder 30 and the holder 40 will be explained. In general, the cutting apparatus of the present invention is heated by radiant heat from an open pipe. As shown in FIG. 1, cooling water is supplied from the holder 40 so as to prevent heat from deteriorating the operating ability of each portion. Therefore, the holder 40 must not merely hold the head portion 20 and the impeder 30 in a fixed position, it must also function as a supply passage for cooling water. Conventionally, the holder is a simple tube, and cooling water is discharged through gaps between the mandrel and rollers which are mounted in the mandrel, whereby each part of the cutting apparatus is cooled. While such an arrangement has the advantage that the structure is simple, it has the drawback that the cooling capacity can not be increased without increasing the amount of cooling water which is discharged from the end of the mandrel. Since it is necessary to suppress the amount of cooling water which is discharged from the mandrel to a level such that the quality of the welded portions is not decreased, as the life span of the cutting tool increases as it has recently, the holder and the impeder end up being inadequately cooled, resulting in problems such as the bending of the holder and the melting of the FRP cover of the impeder. An increase in the life span of the cutting tool is desirable from the standpoint of productivity, but at present, the cooling capacity of the cutting apparatus is inadequate to cope with the increased heating resulting from a lengthened life span, so it is not possible to fully profit from the increased life span of the cutting tool.

The present invention manages to maintain the ability to cool the impeder 30 and the holder 40 as the life span of the cutting tool is increased without increasing the amount of cooling water which is discharged into the pipe being processed. Namely, the impeder 30 and the holder 40 are given a double-walled structure so as to form an inner passageway for cooling water and an outer passageway for discharge water. If a portion of the cooling water passing through the impeder 30 is transferred to the discharge water passageway, the supply of cooling water can be increased without an increase in the amount of discharge water which is discharged from the gaps between the mandrel body 3 and the rollers 4A–4C. The structure of the water passageways is shown in detail in FIG. 1. As illustrated in this figure, the holder 40 has an inner pipe 15 which is used as a cooling water passageway 14 and a coaxial outer pipe 17 which is used as a discharge water passageway 16. The inner pipe 15 and the outer pipe 17 together form a two-walled pipe. A portion of the inner pipe 15 is also used as an impeder inner pipe 15b which forms the axis of the impeder 30. The end 15b of the inner pipe 15 which is on the opposite side of the inner pipe 15 from the impeder 30 functions as a supply inlet 14a. When the cutting tool 2 is replaced, it is necessary to withdraw the cutting apparatus 1 from the open pipe, so the right end of the inner pipe 15 is secured to an unillustrated apparatus for inserting and withdrawing the cutting apparatus 1. Accordingly, the other end 15c of the inner pipe 15 is rigidly secured to the mandrel body 3 and communicates with the central cavity 3a of the mandrel body 3 so as to be able to supply cooling water thereto. This end 15c of the inner pipe 15 is coaxial with respect to the central cavity 3a and is rigidly secured to the rear surface 3f of the mandrel body 3.

Discharge ports can be provided in either the top or bottom surfaces of the outer pipe 17, but as shown in FIG. 1, when discharge openings 17a are formed in the unillustrated bottom surface and in the sides of the outer pipe 17, it is desirable to form air holes 17b in the top surface thereof. Air bubbles inside the outer pipe 17 can escape through the air holes 17b, so the outer pipe 17 can be completely filled with cooling water. Therefore, air bubbles can be prevented from collecting in the outer pipe 17, and thermal strains which were experienced with conventional cutting devices due to the accumulation of air bubbles can be avoided.

The impeder 30 forms a magnetic circuit with a work coil on the outside of the cutting apparatus so that the welding current which is induced in the circumference of the open pipe will concentrate in the portion to be welded. Accordingly, as shown in FIG. 10, the impeder 30 has a ferrite core comprising a plurality of ferrite rods 18 having a length which is equal to the width of the work coil and a diameter of 6-8 mm. These ferrite rods extend axially along the outer periphery of the inner pipe 15a of the impeder 30. The ferrite rods 18 are in intimate contact with one another so as to form a dense layer. They are surrounded by an FRP cover 19 which does not affect the magnetic pathway between the work coil and the ferrite rods 18. The FRP cover 19 serves as the outside of a discharge water passageway 16, so one end 19a thereof is connected to the outer pipe 17 of the holder 40 in a watertight manner, and the other end 19b is connected to the rear surface 3f of the mandrel body 3 in a watertight manner. The inner pipe 15a of the impeder 30 is made of stainless steel so that it will not effect the magnetic circuit of which the ferrite rods 18 are a part and so that it will have adequate strength. As the FRP cover 19 has poor heat resistance, in the illustrated example, it is wrapped with glass tape 31 and coated with a heat-resistant paint 32 to give it adequate heat resistance.

In order for the cooling water which passes through the impeder 30 to be returned via the discharge water passageway 16, a plurality of through holes 15d are formed in the inner pipe 15a near its left end 15c. In addition, a plate 22 having an orifice formed therein is inserted into the cooling water passageway 14 downstream of the through holes 15d. The plate 22 is for the purpose of limiting the rate at which water can be discharged through the head portion 20.

Cooling water which passes through the inner pipe 15a enters the head portion 20, its flow rate being limited by the plate 22. A portion of the cooling water passes through the gaps between the mandrel body 3 and the rollers 4A-4C and cools the rollers 4A-4C and their bearings 6 as it flows into the seam-welded pipe. A portion of the cooling water flows through the through hole 8b in the cutting tool shaft 8, cools the bearings 11 inside the bearing box 9, and then is discharged into the seam-welded pipe. Yet another portion is discharged from the block 3d through the through holes 3e and enters the seam-welded pipe. Still another portion flows through the through holes 15d in the inner pipe 15a, passes through the spaces between the ferrite rods 18 of the impeder 30, flows into the outer pipe 17, and is discharged to the outside of the open pipe through discharge ports 17a.

In order to ascertain the effects of the present invention, the inside beads of hot-shaped seam-welded pipes were cut off using the above-described apparatus of FIG. 1 under the following conditions.

| Seam-welded pipe: | diameter - 114.3 mm, cooling water pressure - 6 kg per square cm |
|---|---|
| Skelp temperature: | 900° C. |
| Cooling water flow rate: | through mandrel - 30 liters/minute through discharge passageway - 20 liters/minute |
| Temperature of weld: | 1400° C. |
| Welding speed: | 70 m/minute |
| Cooling water temperature: | 23° C. |
| Cutting tool material: | cemented carbide |
| Cutting tool orientation: | skew angle - 30°, tilt angle - 20° |

The life span of the cutting tool reached 12 hours. During a period of approximately 70 hours of continuous operation, the cutting tool was replaced 6 times. No damage to the apparatus was discerned, and the bearings of the rollers were still in a condition allowing continued use. Due to increased cooling of the impeder, the power efficiency was increased by 10%.

What is claimed is:

1. A cutting apparatus for cutting off the beads of seam-welded pipes at a line speed of at least 70 m/min comprising:

a holder comprising an inner pipe and a coaxial outer pipe which are spaced apart from one another in the radial direction, the inside of said inner pipe defining a cooling water passageway and the space between said inner pipe and said outer pipe defining a discharge water passageway, said outer pipe having a hole formed therein through which discharge water can exit from said discharge water passageway to the outside of said outer pipe;

an impeder which is rigidly secured to one end of said holder and which comprises an inner pipe and a coaxial outer pipe which are spaced apart from one another in the radial direction, the inner pipe of said impeder being rigidly connected to one end of the inner pipe of said holder so as to form a continuous cooling water passageway, the outer pipe of said impeder being rigidly connected to the outer pipe of said holder so as to form a continuous discharge water passageway, the inner pipe and the outer pipe of the impeder being connected with one another at the end of the impeder which is remote from the holder so that water can flow from said cooling water passageway into said discharge water passageway;

a head portion which is secured to the end of said impeder which is remote from said holder, said head portion having a hollow center which communicates between said cooling water passageway and the outside of said head portion; and a cutting tool which is rotatably mounted on said head portion.

2. A cutting apparatus as claimed in claim 1, wherein said cutting tool is a circular cutting tool.

3. A cutting apparatus as claimed in claim 2, wherein said cutting tool is mounted on said head portion with a skew angle of 25°-35° and a tilt angle as large as possible within the range of 15°-25°.

4. A cutting apparatus as claimed in claim 1, further comprising a cutting tool shaft by means of which said cutting tool is rotatably mounted on said head portion, said cutting tool shaft having an axial through hole formed therein which communicates with the hollow center of said head portion.

5. A cutting apparatus as claimed in claim 1, wherein said head portion includes a block having through holes formed therein which extend between the hollow center of said head portion and the outside of said block in the vicinity of said cutting tool.

6. A cutting apparatus as claimed in claim 1, wherein said head portion includes a plurality of rollers which are rotatably mounted thereon, said rollers opening onto said hollow center of said head portion.

7. A cutting apparatus as claimed in claim 1, wherein the outer pipe of said holder has an air hole formed in its top side through which air bubbles can escape from said discharge water passageway.

8. A method for cutting off a bead from the inside of a seam-welded pipe using cutting means comprising a cutting tool shaft rotatably supporting a freely rotatable circular cutting tool having a diameter of 0.6–0.75 times the inner diameter of the seam-welded pipe at a line speed of at least 70 m/min, comprising the steps of skewing the cutting tool by an angle of 25°–35° with respect to a direction of advance of the pipe, tilting the cutting tool by an angle as large as possible within the range of 15°–25° in the direction of advance of the pipe with respect to the skew surface, moving the pipe relative to the cutting tool such that the cutting tool cuts off the bead from the inside of the pipe, passing liquid cooling means through a head portion of a cutting apparatus which supports the cutting means, and passing the liquid cooling means through a portion of the head portion and directly onto at least part of the cutting means.

9. A method as claimed in claim 1, wherein during the said skewing step, the diameter of the circular cutting tool is less than 75 mm and the skew angle is 30°–35°.

10. A method as claimed in claim 1, wherein the liquid cooling means is passed through the head portion and directly through the cutting tool shaft which rotatably supports the cutting tool during the cutting step.

11. A method as claimed in claim 1, wherein the liquid cooling means is passed through the head portion and directly onto a portion of a blade tip of the cutting tool.

12. A method as claimed in claim 11, wherein the portion of the blade tip directly cooled by the liquid cooling means comprises an upper portion of the blade tip which is not in contact with the bead during the cutting step.

13. A method as claimed in claim 1, wherein the tilting step is performed by tilting the cutting tool at an angle greater than 15°.

14. A method as claimed in claim 1, wherein the tilting step is performed by tilting the cutting tool at an angle of about 20°.

15. A method as claimed in claim 1, wherein the pipe is moved relative to the cutting tool at a speed of at least 70 m/min.

* * * * *